US011427297B2

(12) United States Patent
Balsa-Gonzalez et al.

(10) Patent No.: US 11,427,297 B2
(45) Date of Patent: Aug. 30, 2022

(54) TRAILING EDGE FOR A COMPOSITE MULTISPAR INTEGRATED LIFTING SURFACE AND METHOD FOR MANUFACTURING SAID TRAILING EDGE

(71) Applicant: Airbus Operations S.L.U., Getafe (ES)

(72) Inventors: Alberto Balsa-Gonzalez, Getafe (ES); Jose Luis Lozano Garcia, Getafe (ES); Robert Kobierecki, Getafe (ES)

(73) Assignee: AIRBUS OPERATIONS S.L.U., Getafe (ES)

( * ) Notice: Subject to any disclaimer, the term of this patent is extended or adjusted under 35 U.S.C. 154(b) by 0 days.

(21) Appl. No.: 17/116,343

(22) Filed: Dec. 9, 2020

(65) Prior Publication Data
US 2021/0179255 A1    Jun. 17, 2021

(30) Foreign Application Priority Data

Dec. 11, 2019    (EP) .................................. 19383097

(51) Int. Cl.
*B64C 3/18*    (2006.01)
*B29C 70/34*    (2006.01)
*B64C 3/26*    (2006.01)
*B29L 31/30*    (2006.01)

(52) U.S. Cl.
CPC .............. *B64C 3/185* (2013.01); *B29C 70/34* (2013.01); *B64C 3/182* (2013.01); *B64C 3/26* (2013.01); *B29L 2031/3085* (2013.01)

(58) Field of Classification Search
None
See application file for complete search history.

(56) References Cited

U.S. PATENT DOCUMENTS

| | | | |
|---|---|---|---|
| 2002/0195524 A1* | 12/2002 | Amaoka | B64C 3/00 244/123.2 |
| 2008/0265093 A1 | 10/2008 | Munoz Lopez et al. | |
| 2012/0267479 A1 | 10/2012 | Millepied et al. | |
| 2014/0117166 A1 | 5/2014 | Campbell, Jr. et al. | |
| 2016/0340022 A1 | 11/2016 | Garcia Nieto et al. | |

FOREIGN PATENT DOCUMENTS

| | | |
|---|---|---|
| EP | 2153979 B1 | 10/2016 |
| EP | 3095691 A1 | 11/2016 |
| GB | 162918 * | 5/1921 |

OTHER PUBLICATIONS

European Search Report; priority document dated May 2020.

* cited by examiner

*Primary Examiner* — Alexander S Thomas
(74) *Attorney, Agent, or Firm* — Greer, Burns & Crain, Ltd.

(57) ABSTRACT

A trailing edge for a composite multispar integrated lifting surface includes a first C-shape composite form that includes a web and two flanges. The web forming a portion of the rear spar of a torsion box. The two flanges extending along a skin chordwise direction. A second C-shape composite form includes a web and two flanges. The web forms an auxiliary spar. The flanges extend along the skin chordwise direction. The first C-shape composite form and the second C-shape composite form forming a first auxiliary cell and a second cell. The first auxiliary cell is delimited by the first C-shape composite form and the second C-shape composite form. The second cell is an open cell delimited by the second C-shape composite form.

5 Claims, 5 Drawing Sheets

TRAILING EDGE FOR A COMPOSITE MULTISPAR INTEGRATED LIFTING SURFACE AND METHOD FOR MANUFACTURING SAID TRAILING EDGE

CROSS-REFERENCES TO RELATED APPLICATIONS

This application claims the benefit of the European patent application No. 19383097.3 filed on Dec. 11, 2019, the entire disclosures of which are incorporated herein by way of reference.

FIELD OF THE INVENTION

The invention relates to a trailing edge having a cell concept fully integrated in a multispar torsion box that allows the installation of appropriate systems and of structural components.

BACKGROUND OF THE INVENTION

An aircraft lifting surface comprises a torsion box as its main supporting structure with a leading edge and a trailing edge attached to the torsion box and additionally control surfaces such as flaps, rudders or elevators.

The most widespread structure for a torsion box is formed by an upper panel and a lower panel with thin walls internally reinforced by stringers. The torsion box also includes a front spar, a rear spar and a plurality of ribs transversally arranged and attached to the front spar and the rear spar to provide torsional rigidity.

The leading edge is attached to the front spar area. The trailing edge is attached to the rear spar and it allows control surface installation and movement to complete the aircraft lifting surface.

Another known structural design for a torsion box is the multispar torsion box. The multispar torsion box comprises multiple spars running spanwise and, thus, the ribs are dispensed. The spars comprise, in turn, at least a flange and a web, creating closed cells in order to replace the functions of ribs of the previous concept.

The multispar torsion box comprises upper and lower skins, which are the elements closing the whole torsion box at the upper and lower part and cells and are characterized by mainly supporting compression-traction and shear, the loads in the plane. Stringers may be introduced to achieve enough rigidity of these panels and stabilize them against buckling, without increasing their thickness. Stringers also assume part of the longitudinal flows resulting from bending moments.

The structural elements forming the torsion box, trailing edge and leading edge may be manufactured separately and afterwards mechanically joined.

Alternatively, an integrated multispar torsion box structure of composite material for aircraft comprises the following structural elements:
Lower skin.
Upper skin.
Several spars, which are in turn formed by flanges and webbing.
Several stringers located in the upper skin.
Several stringers located in the lower skin.

An integrated structure is one in which the different structural elements subjected to different stresses (shearing stress, normal stress, etc.) are manufactured at one time or one-shot or start from a single piece of material.

The previous torsion box is created starting from individual elements in composite material which are already integrated from the stacking and which, in turn, assume several structural functions (they form part of the stringer, spar and/or skin at the same time), achieving a required complete integrated structure upon joining several of these elements before the final co-curing phase. This involves having all the advantages of an integrated structure, in addition to a greater manufacturing cost saving as there are fewer parts to be stacked and a more uniform passage of loads between the stacked elements.

A multispar torsion box made from composite material is disclosed in document EP2153979B1.

In both concepts, the leading edge and the trailing are attached to the torsion box by fasteners means. In the multispar concept, there is the possibility to attach the leading edge to the torsion box in one-shot.

A typical trailing edge for an aircraft lifting surface, for instance, a horizontal or vertical tail plane, comprises several ribs, called trailing edge ribs or air load ribs, attached to the rear spar of the torsion box, the upper panels and the lower access doors in order to maintain an aerodynamic shape.

It is necessary to manufacture every part separately and assemble them with fasteners, rivets and screws, leading to a high lead time and costs.

The trailing edge is a complex structure due to the presence of systems installation (hydraulic, electric, actuators . . . ). Main systems installation such as hydraulic pipelines and electrical bundles are installed inside the trailing edge. The electrical systems supply AC and DC power to the aircraft systems. The hydraulic system controls the flight surfaces.

For safety regulations, some of these systems must be segregated to avoid damage of all the systems at the same time. This is called a failsafe design concept. This segregation provides redundancy and prevents any major failure of the aircraft.

In aircraft lifting surfaces with a large volume in its trailing edge, hydraulic systems may be segregated by means of holes in air load ribs. Thus, a first line is installed through the rear spar and a second line through air load rib holes.

In aircraft lifting surfaces with a reduced area in its trailing edge, the segregation may be achieved by locating the hydraulic installation through the leading edge, installing them over the front spar.

Both solutions increase a length of the pipelines, which are usually made from Titanium, and increase the number of supports needed which are riveted to the structure.

In multispar concept with the leading edge integrated in the torsion box, due to obvious impossibility to detach the leading edge from the torsion box, it is difficult and costly to install systems in the front spar and, therefore, all routing and pipe lines should be installed in the rear spar with the help of air load ribs. But in aircraft lifting surfaces with a reduced area in their trailing edge, even installing air load ribs with holes, the distance between hydraulic lines is not enough to fulfil safety requirements.

SUMMARY OF THE INVENTION

The present invention defines a design of a trailing edge taking benefit of a multispar cell concept solving the problem of segregating the hydraulic and electrical system installations. It additionally removes the need for air load ribs and reduces weight and costs in assembly operations, but always maintaining in-service operations and access requirements, as well as other structural requirements.

The trailing edge object of the invention is suitable for a composite multispar integrated lifting surface. The lifting surface comprises a leading edge, a multispar torsion box, a trailing edge attached to the torsion box through a rear spar of the torsion box and upper and lower skins.

A multispar cell concept is based in spars made through C-shape composite forms, the spar flanges of the C-shape composite forms being extended along the skin chordwise direction in a cross-section of the trailing edge.

The trailing edge object of the invention is characterized in that it comprises:

A first C-shape composite form that comprises a web and two flanges. A C-shape means that the composite element comprises an elongated web having one flange at each of the two ends of the elongated web. The flanges extend in the same direction, perpendicularly to the web. The web is adapted to form a portion of the rear spar of the torsion box. The two flanges extend along the skin chordwise direction of the trailing edge. The rear spar may be, therefore, formed by the web of the C-shape applied, for instance, to the web of another form of the torsion box, such that the rear spar is formed by the attachment of two webs, one of the trailing edge and one of the torsion box.

A second C-shape composite form comprising a web and two flanges, the web forming an auxiliary spar of the trailing edge and the flanges extending along the skin chordwise direction of the trailing edge.

The first C-shape composite form and the second C-shape composite form are configured such that a first auxiliary cell and a second cell are formed. A cell is a small compartment or bounded area forming part of the trailing edge.

The first auxiliary cell is delimited by the web and the two flanges of the first C-shape composite form and the web of the second C-shape composite form. Thus, the two flanges of the first C-shape composite form extend along the skin chordwise direction up to the auxiliary spar.

The second cell is an open cell delimited by the web and the two flanges of the second C-shape composite form. It is considered that an open cell is a cell that isn't completely enclosed on all its sides.

The invention has the following advantages:
Fully integrated concept: drastic reduction of assembly operations, tooling and fasteners.
Weight reduction.
Cost reduction.
Improve hydraulic and electrical system segregation.
Primer and paint application reduction.
One-shot manufacturing opportunity.
Reduction of the number of systems support and routing.
No interfaces are affected (control surfaces, actuators . . . )

To segregate system installations, the present invention introduces an auxiliary spar dividing the trailing edge volume into two parts. An additional cell is created between the rear spar of the torsion box and the mentioned auxiliary spar. The generation of the auxiliary spar allows segregation of systems fulfilling safety requirements, making easier installation and reducing number of supports needed.

The final cell is an open cell to allow installation and movement of control surfaces. Besides, symmetry and balanced stacking shall be maintained according to multispar design principles concept in the whole part.

To perform that solution, the first C-shape composite form and the second C-shape composite form are in a row, instead of being in a confronted position as in a traditional multispar torsion box. Therefore, the open part of the C-shape composite form is in the same side or, what is the same, the flanges of both C-shape composite forms extend toward the rear end of the trailing edge.

In addition, due to generation of an auxiliary spar, an additional cell is created. From the current rear spar, until the auxiliary spar. The auxiliary spar may be in an embodiment approximately in the middle, in the chordwise direction, between the rear spar of the torsion box and the elevator hinge line. No additional structure is needed. This reduces the size of bearing ribs that may be attached to the auxiliary spar instead of to the rear spar of the torsion box, improving its cost and weight.

It is also an object of the present invention to provide a composite multispar integrated lifting surface comprising a trailing edge according to the above and an aircraft comprising a lifting structure according to this.

C-shaped composite forms are individually formed when the fiber layers are stacked. Each of these elements assume several structural functions which when joined, give rise to the desired complete configuration. In a last step, the entire component is co-cured in a single cycle and a completely integrated structure is achieved.

It is, therefore, also an object of the present invention to provide the following method for manufacturing a trailing edge for a composite multispar integrated lifting surface, comprising the following steps:

stacking a first and a second composite laminate carried out by a manual or automatic process, bending the first composite laminate to form a first C-shape composite form that comprises a web and two flanges, bending the second composite laminate to form a second C-shape composite form comprising a web and two flanges, joining the first C-shape composite form to the second C-shape composite form such that:

the two flanges of the first C-shape composite form extend along the skin chordwise direction of the trailing edge and the two flanges of the second C-shape composite form extend along the skin chordwise direction of the trailing edge, the web of the second C-shape composite form forms an auxiliary spar of the trailing edge, and a first auxiliary cell and a second cell are formed, the first auxiliary cell being delimited by the web and the two flanges of the first C-shape composite form and the web of the second C-shape composite form and the second cell being an open cell delimited by the web and the flanges of the second C-shape composite form, the web of the first C-shaped composite form being configured to be applied against the rear spar of the torsion box such that the web is adapted to form a portion of the rear spar of the torsion box, and co-curing the trailing edge and the torsion box in one shot.

BRIEF DESCRIPTION OF THE DRAWINGS

To complete the description and in order to provide for a better understanding of the invention, a set of drawings is provided. The drawings form an integral part of the description and illustrate preferred embodiments of the invention. The drawings comprise the following figures.

DETAILED DESCRIPTION OF THE PREFERRED EMBODIMENTS

Figure 1:
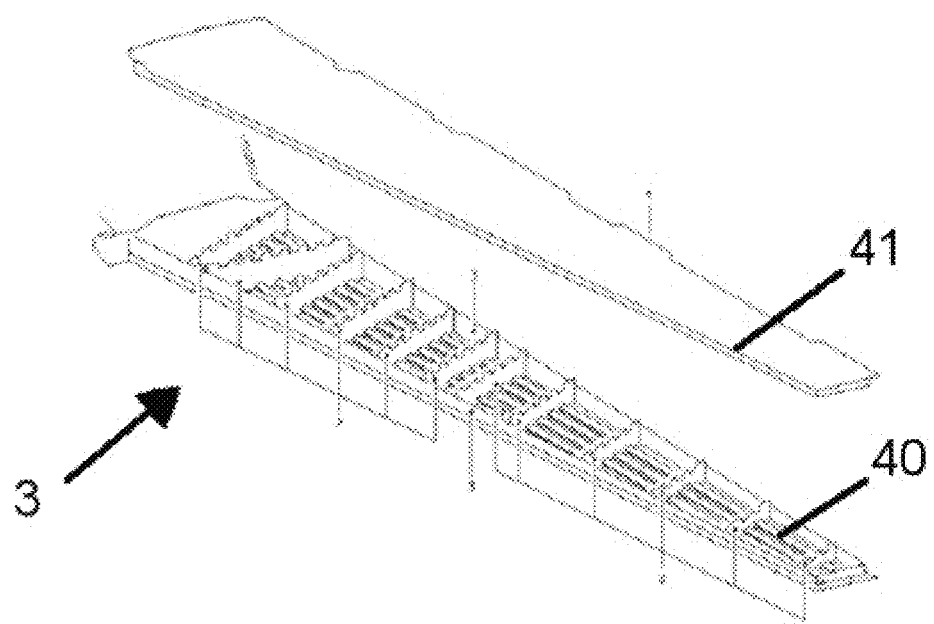
FIG. 1 shows a schematic perspective view of a torsion box known in the state of the art.
Figure 2:
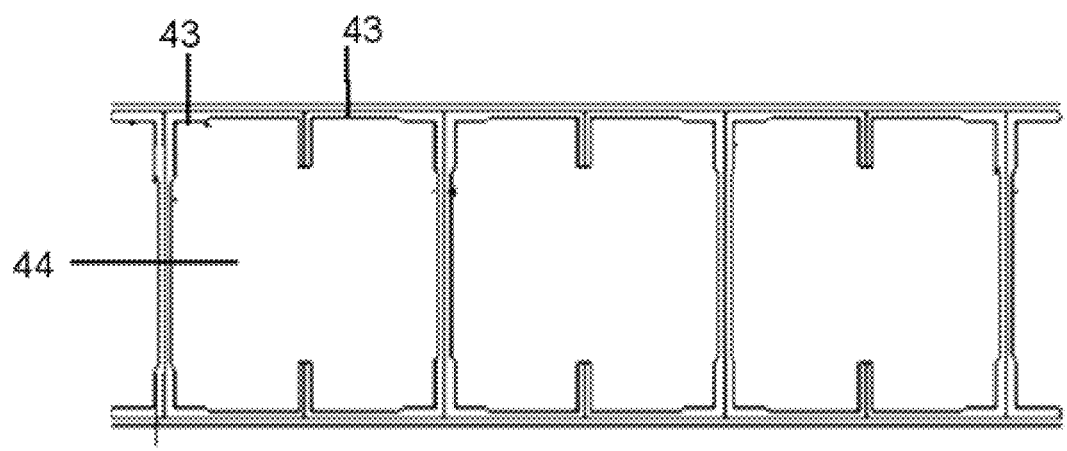
FIG. 2 shows a schematic view of a cross-section of a double C-shape integrated multispar torsion box known in the state of the art.
Figure 3:
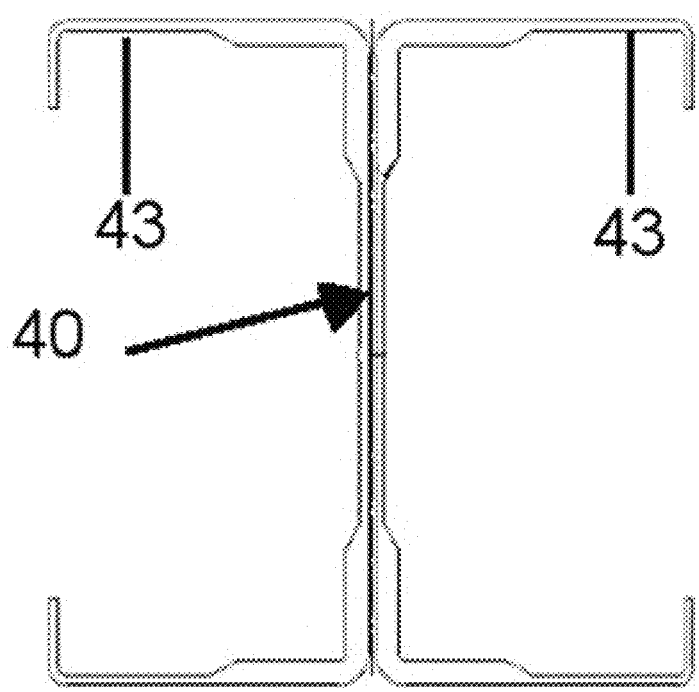
FIG. 3 shows an enlarged view of two double C-shape forms according to the embodiment of FIG. 2.

FIGS. 1, 2 and 3 show an integrated torsion box according to the state of the art.

FIG. 1 shows a perspective view of a torsion box (3) comprising spars (40) running along the spanwise direction of the torsion box (3). An upper skin (41) is also shown.

FIG. 2 shows a double C-shaped structure comprising C-shaped composite forms (43) located facing each other such that cells (44) are formed delimited by the web and flanges of every two C-shaped composite forms (43).

FIG. 3 shows a detailed view of FIG. 2 showing a spar (40) formed by locating together two webs of two C-shaped composite forms (43).

Figure 4:
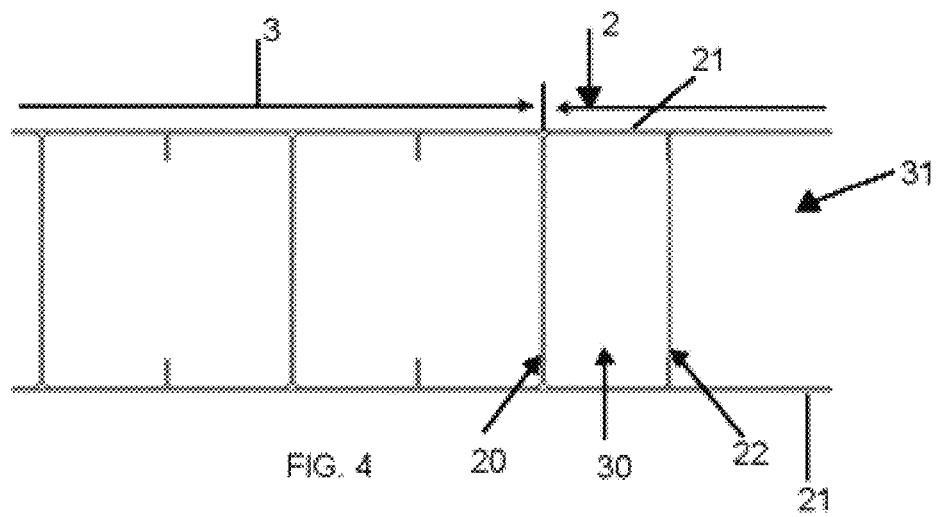
FIG. 4 shows a schematic view of a cross-section of a trailing edge and a portion of a torsion box according to an embodiment of the invention.

FIG. 4 shows a multispar portion of a torsion box (3) according to the state of the art shown in FIGS. 2 and 3 and a trailing edge (2) according to an embodiment of the invention.

Figure 5:
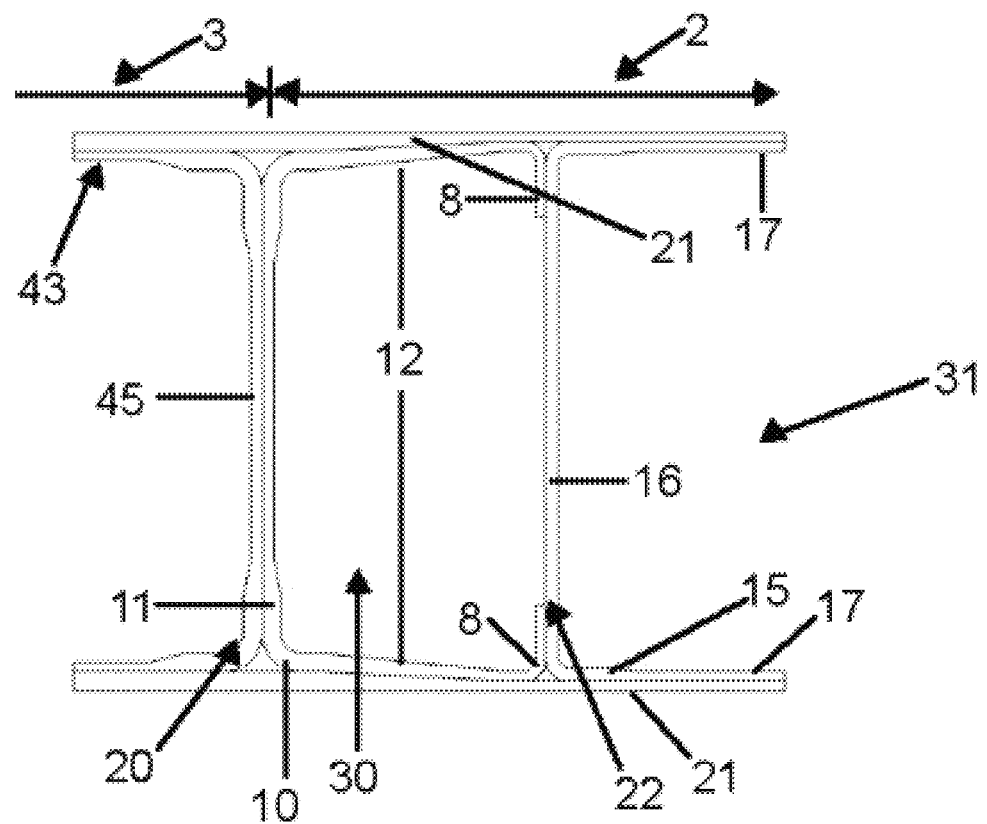
FIG. 5 shows an enlarged view of the embodiment of the trailing edge according to FIG. 4.
Figure 6:
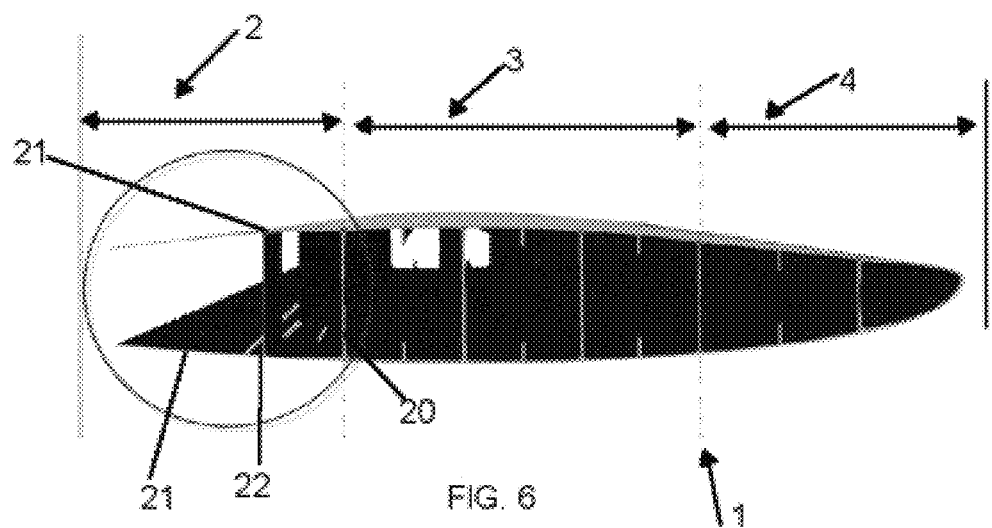
FIG. 6 shows a cross-section perspective view of an embodiment of a lifting surface according to the invention.

FIGS. 5 and 6 show a trailing edge (2) that comprises:

A first C-shape composite form (10) that comprises a web (11) and two flanges (12), the web (11) forming part of the rear spar (20) of the torsion box (3). The other part of the rear spar (20) of the torsion box (3) is formed by the web (45) of the adjacent C-shaped composite form (43) of the torsion box (3). The first C-shaped composite form (10) also comprises two flanges (12), both flanges (12) extend along the skin (21) chordwise direction of the trailing edge (2), specifically along the upper and lower skins (21) towards the rear end of the trailing edge (2).

A second C-shape composite form (15) also comprising a web (16) and two flanges (17). The web (16) forms the auxiliary spar (22) and the flanges (17) extends along the skin (21) chordwise direction of the trailing edge (2) towards its rear end.

Therefore, a first auxiliary cell (30) and a second cell (31) are formed. The first auxiliary cell (30) is delimited by part of the rear spar (20), specifically by the web (11) of the first C-shape composite form (10) and by the two flanges (17) of the first C-shape composite form (10) and by the auxiliary spar (22) which is formed by the web (16) of the second C-shape composite form (15). The second cell (31) is the open cell delimited by the auxiliary spar (22), i.e., the web (16) of the second C-shape composite form (15) and the two flanges (17) of the second C-shape composite form (15).

More particularly, in the shown embodiment, the flanges (12) of the first C-shape composite form (10) comprise a bent part (18) which is parallel to the web (11) of the first C-shape composite form (10). As the flanges (12) extend along the skin (21) chordwise direction, each bent part (18) extends towards the other bent part (18). The flanges (12) of the first C-shape composite form (10) extend along the skin (21) chordwise direction up to the auxiliary spar (22) and then along the auxiliary spar (22) surface, i.e., along the web (16) of the second C-shape composite form (15).

Thus, in the shown embodiment, the auxiliary spar (22) is formed by the web (16) of the second C-shape composite form (15) and the further bent parts (18) of the first C-shape composite form (10).

The bent part (18) is applied to the web (16) of the second C-shape form (15) or, what is the same, is attached to the web (16) of the second C-shape form (15). In that way, the auxiliary spar (22) is stiffened by the bent parts (18) of the first C-shape form (10).

In FIG. 5 is shown that the bent part (18) of the first C-shape form (10) extend along just a portion of the web (16) of the second C-shape form (15). Thus, the auxiliary spar (22) has the particularity to show two different thickness areas. Upper and lower areas of the auxiliary spar (22) comprises the bent part (18) of the first C-shape composite form (10) and the web (16) of the second C-shape composite form (15). The auxiliary spar (22) comprises a second area in the middle portion of the auxiliary spar (22) where only the web (16) of the second C-shape form (15) exists.

Figure 7:
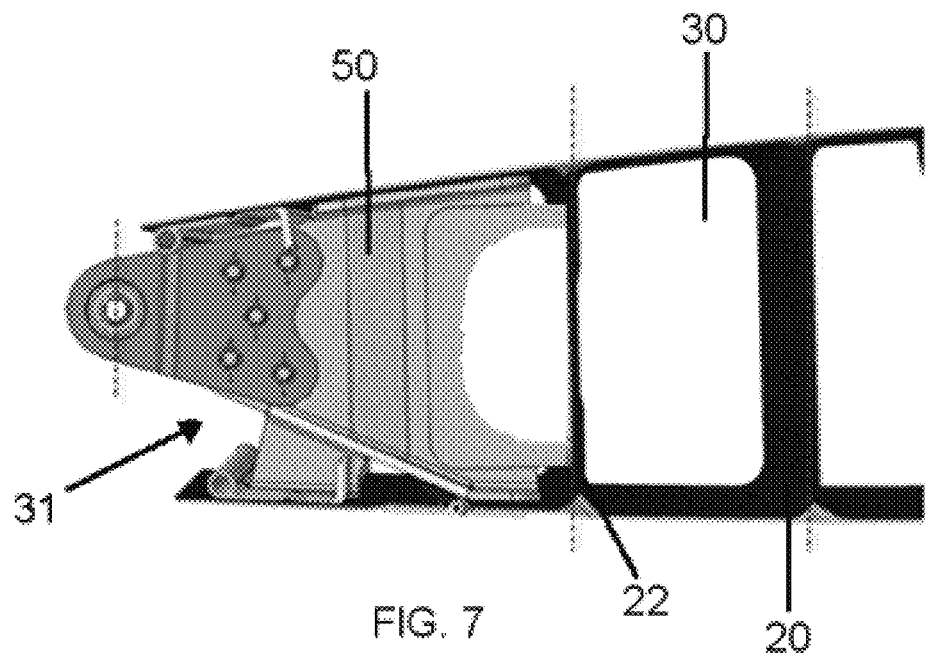
FIG. 7 shows a cross-section of an embodiment of a trailing edge according to the invention and a rib attached to the auxiliary spar.
Figure 8:
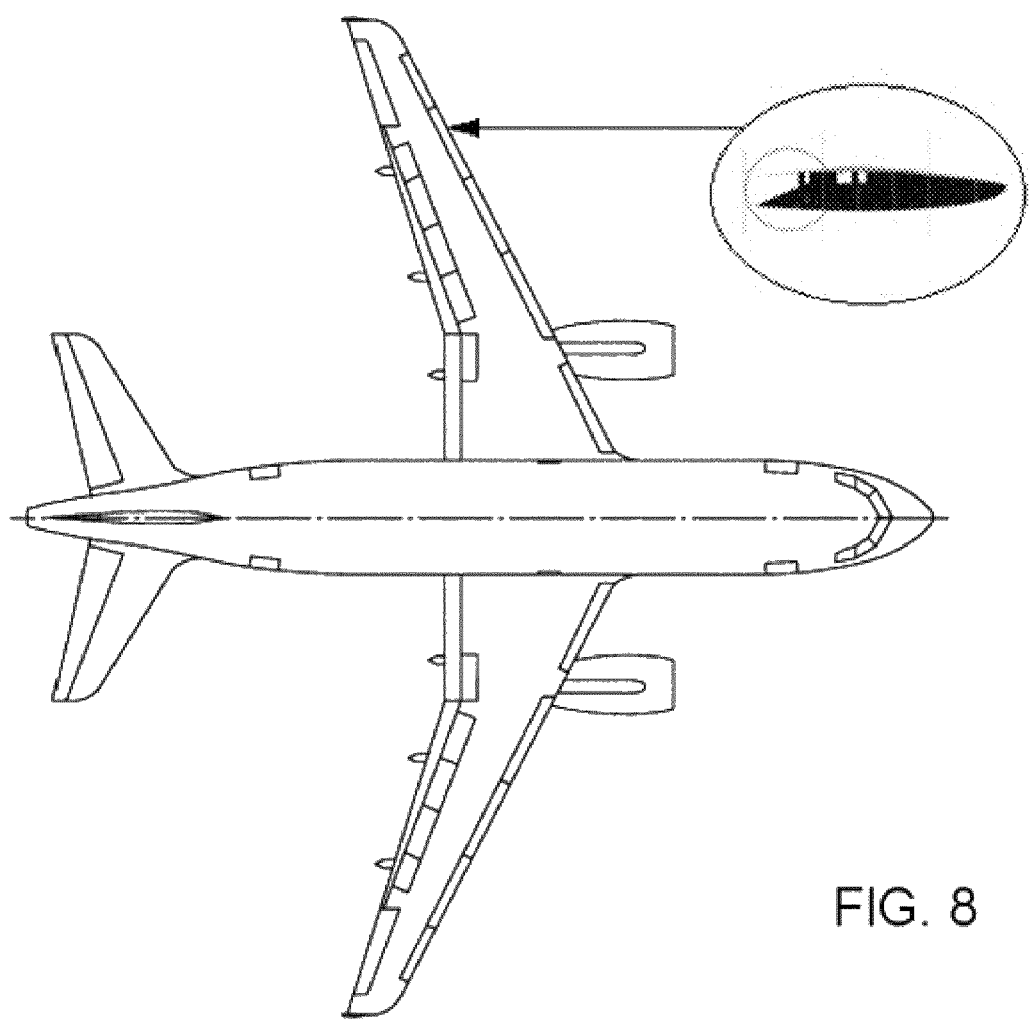
FIG. 8 shows an aircraft according to the invention.

FIG. 7 discloses bearing ribs or hinge ribs (50) that may be attached to upper and lower flanges (17) to transmit loads coming from the control surfaces. As previously stated, this reduces the size of bearing ribs (50) that may be attached to the auxiliary spar (22) instead of to the rear spar (20) of the torsion box (3), improving its cost and weight.

The detailed steps of an embodiment of the method for manufacturing a multispar integrated trailing edge (1) of composite material will be described below, which process may be divided into the following steps:

In step 1, the, for instance, carbon fiber or fiberglass, layers are separately stacked in a planar manner, which layers form each element.

In step 2, the stack is bent. This bending can be carried out in different ways, preferably by means of applying a vacuum and temperature cycle molding the stack with the desired geometry by means of the suitable jig.

In step 3, the different elements are joined to form the integrated structure, according to FIGS. 4 to 6.

In step 4, the complete structure is cured by means of applying a pressure and temperature cycle, with the aid of the suitable jig system, which allows the suitable compaction of all the areas of the structure.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A trailing edge for a composite multispar integrated lifting surface, the lifting surface comprising a leading edge, a multispar torsion box, a trailing edge attached to the torsion box through a rear spar of the torsion box and upper and lower skins, the trailing edge comprising:

a first C-shape composite form that comprises a web and two flanges, the web configured to form a portion of the rear spar of the torsion box and the two flanges extending along a skin chordwise direction of the trailing edge, a second C-shape composite form comprising a web and two flanges, the web forming an auxiliary spar of the trailing edge and the flanges extending along the skin chordwise direction of the trailing edge, the first C-shape composite form and the second C-shape composite form are configured such that a first auxiliary cell and a second cell are formed, the first auxiliary cell being delimited by the web and the two flanges of the first C-shape composite form and by the web of the second C-shape composite form, the second cell being an open cell delimited by the web and the two flanges of the second C-shape composite form, wherein the two flanges of the first C-shape composite form comprise a further bent part parallel to the web of the first C-shape composite form, the bent parts being applied against the web of the second C-shape composite form for forming the auxiliary spar together with the web.

2. The trailing edge for a composite multispar integrated lifting surface, according to claim 1, wherein the bent parts of the first C-shape composite form extend along a portion of the web of the second C-shape composite form.

3. A composite multispar integrated lifting surface, comprising:
   a leading edge,
   a multispar torsion box, and
   a trailing edge, formed according to claim 1, attached to the torsion box through a rear spar of the torsion box and upper and lower skins.

4. An aircraft comprising a composite multispar integrated lifting surface according to claim 3.

5. The trailing edge for a composite multispar integrated lifting surface, according to claim 1, wherein the open cell is defined by a structure comprising an open side wherein the structure is not completely enclosed on all its sides.

\* \* \* \* \*